May 11, 1943.  J. A. CROWLEY, JR  2,319,185
CLAY ACTIVATION
Filed Oct. 17, 1939  2 Sheets-Sheet 1
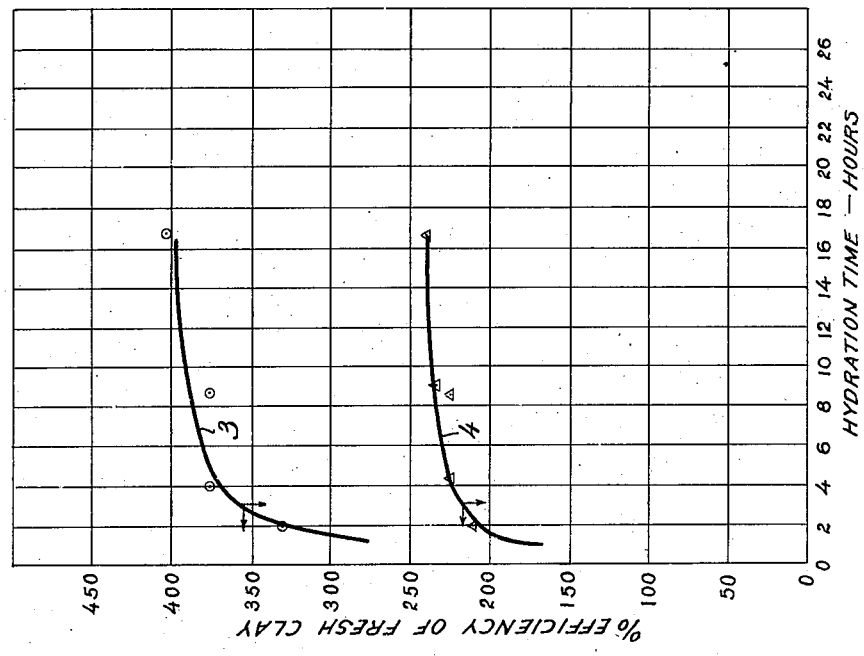
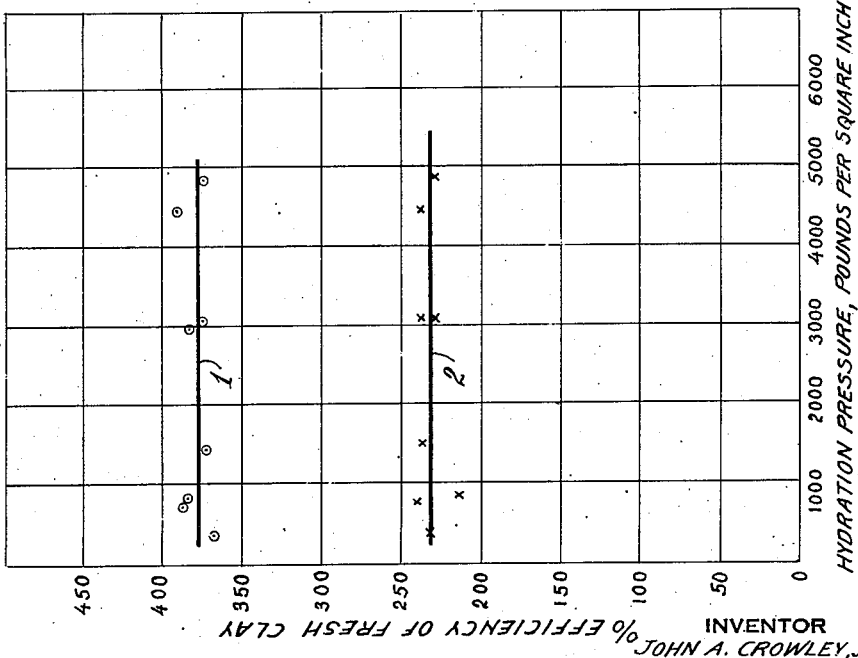
INVENTOR
JOHN A. CROWLEY, JR.
BY
ATTORNEY May 11, 1943.    J. A. CROWLEY, JR    2,319,185
CLAY ACTIVATION
Filed Oct. 17, 1939    2 Sheets-Sheet 2
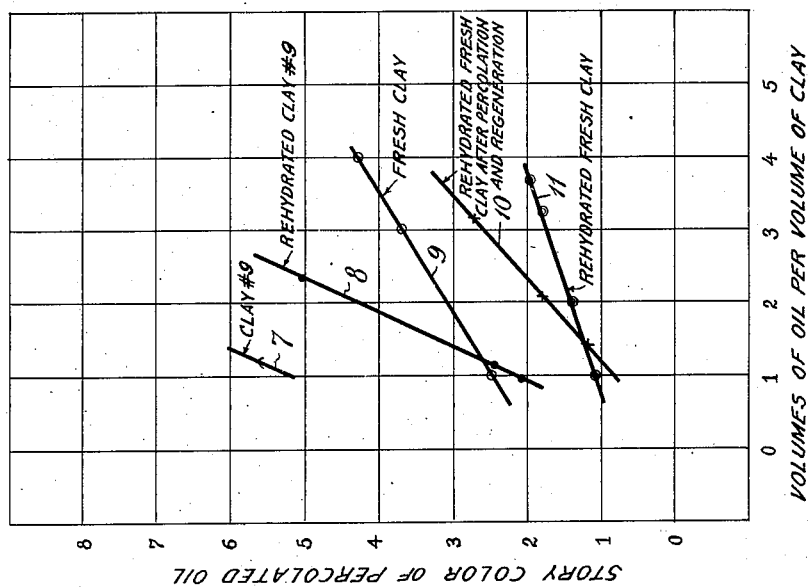
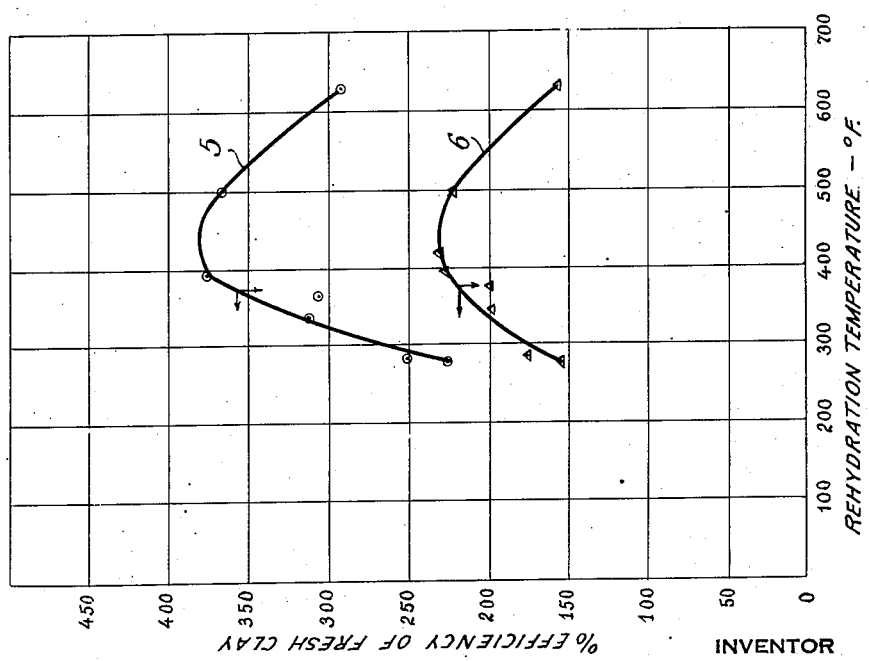
INVENTOR
JOHN A. CROWLEY, JR.
BY
ATTORNEY Patented May 11, 1943

2,319,185

UNITED STATES PATENT OFFICE 2,319,185

CLAY ACTIVATION

John A. Crowley, Jr., Woodbury, N. J., assignor to Socony-Vacuum Oil Company, Incorporated, New York, N. Y., a corporation of New York Application October 17, 1939, Serial No. 299,796

5 Claims. (Cl. 252—277)

This invention relates to a method for improving the activity and life of finely divided solid adsorbent materials used in the treatment of oily and/or carbonaceous materials. The invention particularly relates to the regeneration or revivification of finely divided adsorbent clays used in the refining of petroleum products.

Enormous quantities of clays are used, for instance, throughout the petroleum industry as filtering and adsorbent means for refining petroleum products. In general three different methods are used for refining petroleum oils with clays. These methods are the percolation process wherein liquid oil is percolated through granules of the clay, the contact process wherein liquid oil is contacted with finely pulverized clay and the vapor process wherein oil vapors are passed through granules of the clay. In all these methods, after the clays have refined a certain amount of oil they become so contaminated with carbonaceous impurities collected from the oil that they must be regenerated or discarded. Usually the contact clays are discarded after the first use and once used vapor process clays are thereafter employed in percolation processes. Accordingly, in practice, granular percolation clays are usually the only clays regenerated.

In addition to being petroleum refining materials, finely divided adsorbent clays serve as a refining medium for other oily and/or carbonaceous and/or color bearing materials. For instance many plant oils and liquors are refined with such clays. Furthermore finely divided adsorbent clays and the like are used in other processes wherein carbonaceous matter is deposited on the clay. In all such uses the clays must be regenerated by removal of the inactive carbonaceous matter, if the clays are to be reused, and reuse of the clays is most desirable from an economic standpoint. My invention is concerned with improving the efficiency of such clays.

Particularly in the petroleum art, finely divided adsorbent clays, if regenerated, are usually regenerated by a chemical oxidation of the carbonaceous impurities which generally consists of burning off the impurities. Various methods are used for carrying out the burning of granular spent refining clay. One of the first methods comprised spreading the clays on an open hearth and burning it. Today there are three principal methods in general use. In the first method the clay falls or cascades over baffles set at about a 45° angle through a flue countercurrent to gases of combustion. In the second method the clay is regenerated in a rotary kiln slightly inclined from the horizontal. In the third method, which probably is the most commonly used, multiple hearth burners are employed. These multiple hearth furnaces or burners are substantially the same as used in the roasting of ore and are of either the Nichols-Herreshoff or Wedge type. In these burners the clay is slowly rabbled across each hearth, dropping from one to another until the bottom hearth is reached. In all of these conventionally used methods there is a progressive degradation in the efficiency of the clay with each burning and finally the clay must be discarded to waste since it is no longer capable of being regenerated sufficiently to warrant further treatment.

The two co-pending applications S. N. 210,150, filed May 26, 1938, and S. N. 270,943, filed April 29, 1939, of John W. Payne disclose and claim two other methods adapted for regenerating clay. In these Payne processes the degradation in efficiency is less with each burning than in the other methods or even negligible, however, in all the above methods, a burned regenerated clay, in general, is never substantially more efficient than the original fresh clay.

Since refining clays nowadays which have had a different number of burnings have different efficiencies, they are kept separate and separately classified. In some of the larger refineries extensive inventories and bin facilities are required in order to maintain the clays according to their classification or efficiency. Not only do the large inventories of clay, bin facilities, etc., mean added expense but quite obviously the successive degradation in efficiency and the corresponding requirement of more clay increases the expense.

One of the most important disadvantages of the commonly used clay regeneration methods is the fact the clay can only be regenerated a very limited number of times before its efficiency is so low that it does not pay to regenerate it, at which time the clay is thrown away to waste. In general, granular petroleum filter clays are regenerated seven or eight times or less and practically never more than ten or fifteen times, at which time their efficiency is reduced to about 50% of the original and they are thrown away. As stated above, the finely pulverized contact clays, e. g., 200 mesh or finer, which are less frequently used, are practically never regenerated but rather thrown away after each use.

It is a well known fact that every heavy oil refinery in the country has large dumps of spent clays that have been thrown away to complete waste. In some cases this waste clay is left as a dump and in other cases it is used for filling in low land, sold for fertilizers, etc. However, in all cases there is this enormous discarding of spent clays. Such waste is accepted as a necessary evil of the process.

In certain fields, usually elsewhere than in the petroleum art, it is known to remove the carbonaceous matter from the finely divided adsorbent clays by use of organic solvents. Likewise it has been suggested to treat adsorbent clays containing fat impurities with water at elevated temperatures to wash off the clays and float away oil and/or fat.

It is an object of our present invention to provide a method of improving the activity of solid adsorbent materials such as clays used in the treating of oily and/or carbonaceous materials.

Another object is to provide a method of regenerating refining clays in such a manner that the regenerated clays are even more efficient than the original fresh clay.

Still another object of the present invention is to provide a method of regenerating clays used in refining petroleum products in such a manner that the clays do not suffer substantial progressive degradation in efficiency with each regeneration.

Another object is to provide a method of improving the refining activity of a fresh clay which has never been used before for refining products.

Still a further object is to provide a regenerated clay which has a higher activity than the original fresh adsorbent.

My invention comprises hydrating finely divided adsorbents such as clays which have been subjected to a burning or heating operation. I have discovered that a large part, if not all, the loss in activity suffered by a clay regenerated carefully so as to prevent sintering or chemical decomposition of the contained hydrates is apparently due to loss of water of hydration. Still further, I have discovered that if such clay is rehydrated, not only does it regain its original activity, but also the rehydrated clay acquires a surprisingly increased activity over its original activity.

At present it appears my invention is perhaps most useful in practice for increasing the efficiencies of clays which have been regenerated in conventional manner by burning. However it is to be clearly understood that finely divided adsorbent clay may be hydrated in accordance with my process irrespective of whether it is a fresh burned clay or a regenerated spent clay. However the fresh clay must first be burned and the spent clay must be regenerated, i. e., freed from oily hydrocarbon or carbonaceous matter which prevents wetting of the active material of the adsorbent with water. The regeneration may be by burning. extracting with solvents, etc., before hydration. Therefore by my process a new fresh burned clay may be hydrated to yield a clay of greater activity than the original fresh burned clay or a clay which has been regenerated one or more times may be hydrated to give a clay of substantially increased activity.

In any event, as stated above, the clay should be burned or heat treated prior to hydration in order to obtain optimum decolorizing efficiency and furthermore, such heat treatment prevents fresh clay from becoming plastic upon hydration which would result in a lumpy condition, when dried, probably necessitating re-grinding. It is important to note that by my process finely divided adsorbent clays are treated and such clays retain their finely divided condition and adsorbent property throughout the regenerating treatment.

I have found that the finely divided burned or heated adsorbent clays may be effectively rehydrated to improve their refining or treating qualities, for instance, in a manner somewhat similar to the hydration of molding clays for increasing their plasticity. Thus the finely divided adsorbent clays of my invention may be hydrated by treating with liquid water at elevated temperatures and pressures. The temperatures of treating may vary over a relatively wide range as from about 275° to 650° F., with temperatures of about 400° to 500° F. giving optimum results. The pressures used may be quite high, as, for example, 5000# per square inch. The principal requirements of the pressure is that it be sufficiently high to maintain the water in a liquid state and while higher pressures may be used, ordinarily no additional advantages are obtained thereby. The treating time for rehydrating the clays may also vary considerably. I have treated clays from one hour to 16½ hours and from my observations, it appears the clays should be treated at least four hours for best results. Up to four hours time the increase in activity is quite rapid and after about four hours time the increase in activity is relatively slow per unit of additional heating time. The precise conditions of operation may, and probably will, vary somewhat with the different types of clays being treated.

One of the important features of the present invention resides in the fact that finely pulverized contact clays may be regenerated or revivified as well as granular clays. Accordingly, by my process, even spent contact clays may be feasibly regenerated and therefore need not be discarded after one use.

The hydration of the finely divided adsorbent clays, either fresh or spent, which have had inactive impurites removed therefrom, may be carried out in batch or continuous manner. Continuous rehydration of the clays might be carried out by mixng the clay with sufficient water to make a pumpable slurry, which slurry is then passed through a tubular furnace into hydration chambers where the slurry is kept under pressure for a sufficient length of time to complete the reaction, hydrated clay being withdrawn from the chambers at required time intervals.

In order to further illustrate the invention, reference is made to the accompanying drawings. The curves shown in Figs. 1-3, refer to the petroleum oil decolorizing efficiencies of finely pulverized contact clays which were hydrated under various conditions of time, temperature, and pressure. The efficiencies of the hydrated clays are expressed in terms of percent of the efficiency of the same clay in a fresh condition. The curve shown in Fig. 4 refers to the petroleum oil decolorizing efficiencies of both fresh and spent granular clays which have been hydrated and not hydrated.

In Fig. 1 the curves show the result of hydrating finely pulverized contact clay at constant temperature (400-430° F.) and time (8-9 hours) but at variable pressures. The pressures are plotted against efficiencies of the hydrated clays expressed as percentages of the efficiency of fresh clay. Curve I refers to decolorizing efficiencies, when comparisons are made on the basis of 175 Story color and curve 2 refers to decolorizing efficiencies when comparisons are made on the basis of 350 Story color of a treated oil. It will be noted that increases of pressure above that required to maintain the water in a liquid state has little effect on the process.

The curves of Fig. 2 show the results of hydrating finely pulverized contact clay at a constant temperature (400-430° F.) and pressure (2900-3200# per sq. in.) but for various lengths of time. The time of hydration is plotted against efficiencies of hydrated clays expressed as percentages of the efficiency of the same clay in a fresh state. Curves 3 and 4 refer to decolorizing efficiencies of the rehydrated clays when comparisons are made on the basis of 175 and 350 Story colors of the treated stock, respectively. It will be noted from these curves that the efficiency increases rapidly up to a heating time of about four hours, after which, increase in efficiency is less rapid.

The curves in Fig. 3 show the results of hydrating finely pulverized contact clay at a constant pressure (2850-3200# per sq. in.) and time (8-9 hours) but at various temperatures. The hydration temperature was plotted against efficiencies of hydrated clays expressed as percentages of the efficiency of the same clay in a fresh state. Curves 5 and 6 refer to decolorizing efficiencies of the hydrated clays when comparisons are made on the basis of 175 and 350 Story colors of the treated stock, respectively. For this clay it will be noted that the optimum temperature of heating is from about 400-500° F.

The curves of Fig. 4 show the results of hydrating granular clay. The fresh clay was hydrated for 9¼ hours at 505° F. and 2200# per sq. in. pressure. The clay #9, No. 9 Attapulgas clay (has had 9 burning regenerations), was hydrated for 8¼ hours at 420° F. and 1050# per sq. in. pressure. In the curves, volumes of oil treated per volume of clay is plotted against color of the percolated oil. These curves show the definite advantage obtained by my process of hydration. Moreover, curve 10 discloses that a hydrated clay retains a part of its increased efficiency even after a subsequent use and conventional burning regeneration.

In some cases my hydration process may soften the clay somewhat, in which case the mechanical strength may be improved, if desired or necessary, by burning in a manner similar to that used for hardening raw clays.

From the foregoing, the definite advantages of my process are easily seen. Thus hydration of fresh or of spent and regenerated finely pulverized contact clays gives a product which has a decolorizing efficiency of approximately three times that of the ordinary fresh clay. On the other hand, regeneration of spent, finely pulverized contact clay by burning alone yields a product which is only 50% to 60% as efficient as fresh clay, and regeneration with solvents at best would not yield a product which surpassed the efficiency of the fresh clay. In a similar manner either fresh or spent and regenerated granular clays are improved by my process of hydration.

Throughout the specification I have indicated the water lost from the clay and the water acquired by my treatment as water of hydration. It is not intended to be limited by this terminology which has been used in the absence of more definite knowledge. It is known that water is lost and gained in some manner. This water might be water of hydration, water of constitution, physically adsorbed surface water, etc. Accordingly it is to be understood that herein where I have spoken of water of hydration, the expression is not to be limiting but illustrative of the various possibilities.

I claim:

1. The method of treating roasted adsorbent clay that has been regenerated and is substantially free of carbonaceous matter, in order to increase its refining efficiency for carbonaceous products, which comprises hydrating the roasted adsorbent clay by treating the clay under hydrating conditions in contact with sufficient water in the liquid state to effect the desired hydration with only said liquid water, said water being heated to at least about 275° F. but maintained under sufficient pressure to keep it substantially entirely in liquid phase, thereby substantially increasing the efficiency of the clay, said hydration of the clay being effected in the substantial absence of steam and while substantially maintaining the structure of the clay.

2. The method of increasing the decolorizing activity of spent petroleum decolorizing clay which comprises regenerating the spent clay by burning off carbonaceous impurities and then hydrating the burned clay under hydrating conditions in contact with sufficient water in the liquid state to effect the desired hydration with only said liquid water, said water being heated to at least about 275° F. but maintained under sufficient pressure to keep it substantially entirely in liquid phase, thereby substantially increasing the efficiency of the clay, said hydration of the clay being effected in the substantial absence of steam and while substantially maintaining the structure of the clay.

3. The method of treating roasted adsorbent clay that has been regenerated and is substantially free of carbonaceous matter, in order to increase its refining efficiency for carbonaceous products, which comprises hydrating the roasted absorbent clay by treating the clay for a sufficient length of time in contact with sufficient liquid water at a temperature between about 275° and about 650° F. and under sufficient pressure to maintain the water in the liquid state that the desired hydration is effected with only said liquid water, thereby substantially increasing the efficiency of the clay, said hydration of the clay being effected in the substantial absence of steam and while substantially maintaining the structure of the clay.

4. The method of treating a roasted regenerated adsorbent clay that is substantially free of carbonaceous matter in order to increase its decolorizing efficiency for petroleum lubricating oils which comprises hydrating the regenerated absorbent clay by treating the clay for at least about four hours in contact with sufficient liquid water at a temperature between about 275° and about 650° F. and under sufficient pressure to maintain the water in the liquid state that the desired hydration is effected with only said liquid water, thereby substantially increasing the efficiency of the clay, said hydration of the clay being effected in the absence of steam and while substantially maintaining the structure of the clay.

5. The method of treating roasted adsorbent clay that has been regenerated and is substantially free of carbonaceous matter, in order to increase its decolorizing efficiency for petroleum lubricating oils, which comprises hydrating the roasted adsorbent clay by treating the clay for at least about four hours in contact with sufficient liquid water at a temperature between about 400 and about 500° F. and under sufficient pressure to maintain the water in the liquid state that the desired hydration is effected with only said liquid water, thereby substantially increasing the efficiency of the clay, said hydration of clay being effected in the substantial absence of steam and while substantially maintaining the structure of the clay.

JOHN A. CROWLEY Jr.